(12) United States Patent
Alexander et al.

(10) Patent No.: US 10,081,969 B2
(45) Date of Patent: Sep. 25, 2018

(54) LOCKABLE LATCHING DEVICE

(71) Applicants: GM GLOBAL TECHNOLOGY OPERATIONS LLC, Detroit, MI (US); Dynalloy, Inc., Tustin, CA (US)

(72) Inventors: Paul W. Alexander, Ypsilanti, MI (US); Roger Herbert Culver, Warren, MI (US); Robert Dallos, Jr., Canton, MI (US); Aragorn Zolno, Whittier, CA (US); James Holbrook Brown, Temecula, CA (US)

(73) Assignees: Dynalloy, Inc., Tustin, CA (US); GM Global Technology Operations LLC, Detroit, MI (US)

( * ) Notice: Subject to any disclaimer, the term of this patent is extended or adjusted under 35 U.S.C. 154(b) by 787 days.

(21) Appl. No.: 14/686,065

(22) Filed: Apr. 14, 2015

(65) Prior Publication Data

US 2015/0300058 A1 Oct. 22, 2015

Related U.S. Application Data

(60) Provisional application No. 61/980,318, filed on Apr. 16, 2014.

(51) Int. Cl.
*E05C 5/00* (2006.01)
*E05C 1/12* (2006.01)
(Continued)

(52) U.S. Cl.
CPC .......... *E05B 47/0009* (2013.01); *E05B 83/28* (2013.01); *E05C 19/022* (2013.01); *F03G 7/065* (2013.01)

(58) Field of Classification Search
CPC .. E05B 47/0009; E05B 51/005; E05B 65/104; E05B 83/34; E05C 19/022
(Continued)

(56) References Cited

U.S. PATENT DOCUMENTS 3,832,243 A * 8/1974 Donkersloot et al. .... C22C 1/02
148/402
4,225,764 A * 9/1980 Buttner ................ H01H 17/165
200/518
(Continued)

FOREIGN PATENT DOCUMENTS

CN 101107414 A 1/2008
CN 101839099 A 9/2010
(Continued)

*Primary Examiner* — Carlos Lugo
*Assistant Examiner* — Faria F Ahmad
(74) *Attorney, Agent, or Firm* — Quinn IP Law

(57) ABSTRACT

A lockable latching device includes a body defining a cavity therein and having a central longitudinal axis, and a plunger disposed within the cavity. The plunger has a first end and a second end and is translatable with respect to the body along the axis between an open position and a closed position. The device also includes an annular rotator spaced apart from the body along the axis and configured for rotating the plunger about the axis. The device includes an annular latch abutting the rotator that is transitionable between an unlocked state and a locked state. The device also includes an element attached to the latch and formed from a shape memory alloy that is transitionable between an austenite crystallographic phase and a martensite crystallographic phase in response to an activation signal to thereby transition the latch from the locked state to the unlocked state.

16 Claims, 4 Drawing Sheets

(51) Int. Cl.
*E05B 47/00* (2006.01)
*E05C 19/02* (2006.01)
*F03G 7/06* (2006.01)
*E05B 83/28* (2014.01)

(58) Field of Classification Search
USPC .............. 292/63, 169, 65, 170, DIG. 37
See application file for complete search history.

(56) References Cited

U.S. PATENT DOCUMENTS

| | | | | |
|---|---|---|---|---|
| 4,249,761 A * | 2/1981 | Nishimura | ............ | E05C 19/165 292/251.5 |
| 4,286,811 A * | 9/1981 | Schantz | ............ | D06F 37/42 292/201 |
| 4,319,659 A * | 3/1982 | Heckelman | ............ | E05B 83/24 180/271 |
| 4,617,448 A * | 10/1986 | Goldowsky | ............ | E05B 47/0009 148/402 |
| 4,948,928 A * | 8/1990 | Willigman | ............ | H01H 13/56 200/38 A |
| 5,055,643 A * | 10/1991 | Pardini | ............ | H01H 3/022 200/302.2 |
| 5,108,523 A * | 4/1992 | Peterseim | ............ | C22F 1/006 148/402 |
| 5,178,265 A * | 1/1993 | Sepke | ............ | H01H 13/58 200/528 |
| 5,272,894 A * | 12/1993 | Stillwagon | ............ | E05B 63/121 292/251 |
| 5,384,442 A * | 1/1995 | Danner | ............ | G05G 1/087 200/336 |
| 7,152,892 B2 * | 12/2006 | Rechberg | ............ | A47G 25/065 292/304 |
| 7,695,031 B2 * | 4/2010 | Jackson, Jr. | ............ | E05B 1/0038 292/169 |
| 8,585,119 B2 * | 11/2013 | Beck | ............ | B60K 15/05 296/97.22 |
| 8,845,001 B2 * | 9/2014 | Kotama | ............ | B60L 11/1818 296/97.22 |
| 2007/0216169 A1 * | 9/2007 | Jackson, Jr. | ............ | E05B 1/0038 292/169 |
| 2011/0174102 A1 * | 7/2011 | Beck | ............ | B60K 15/05 74/110 |

FOREIGN PATENT DOCUMENTS

| | | |
|---|---|---|
| CN | 102016207 A | 4/2011 |
| CN | 102656044 A | 9/2012 |
| CN | 103423115 A | 12/2013 |
| EP | 2182148 A2 | 10/2009 |

\* cited by examiner

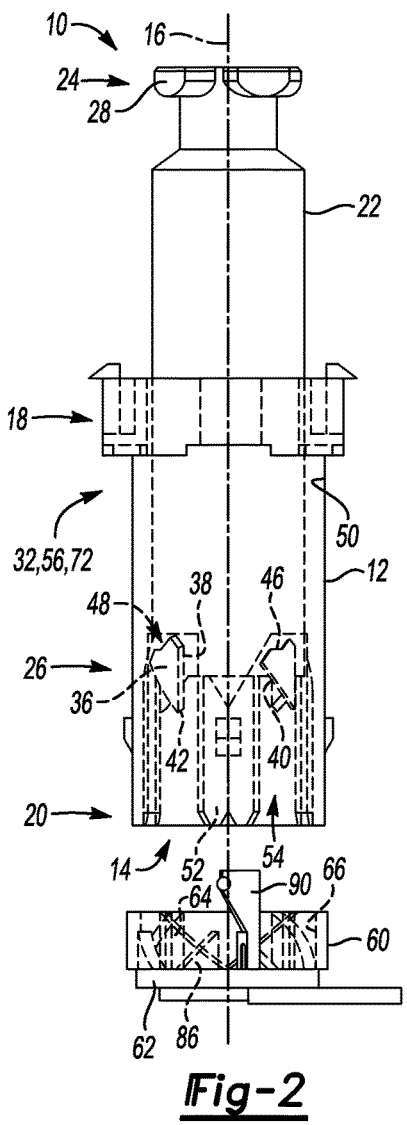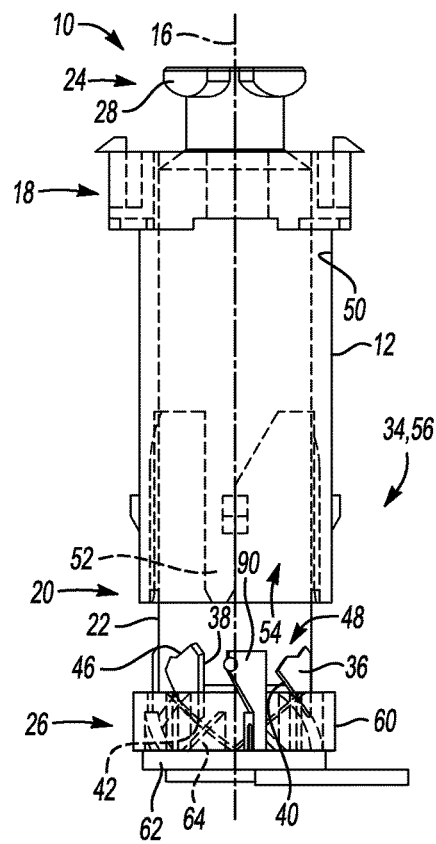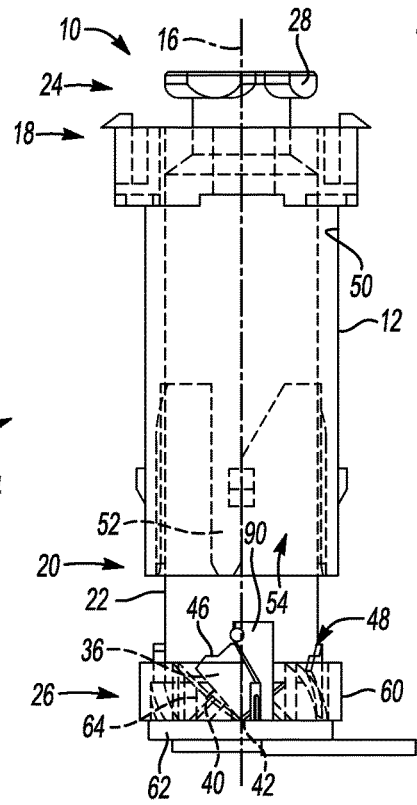

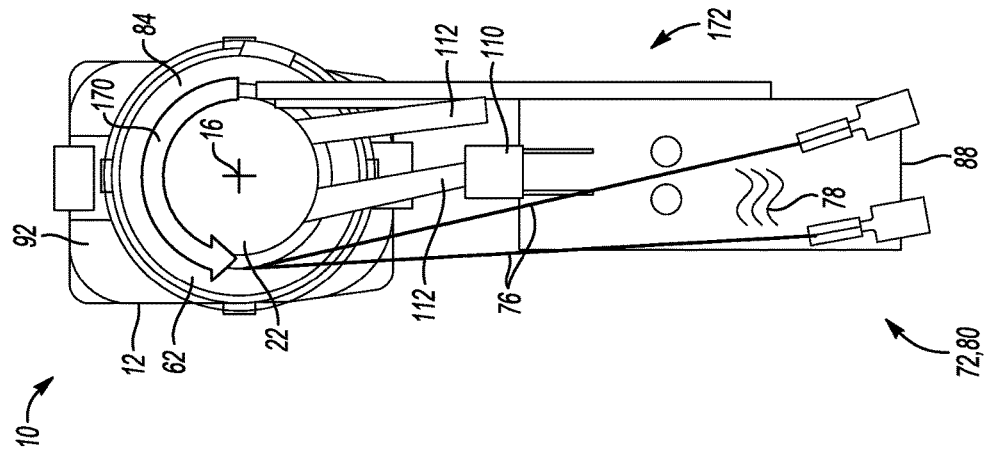
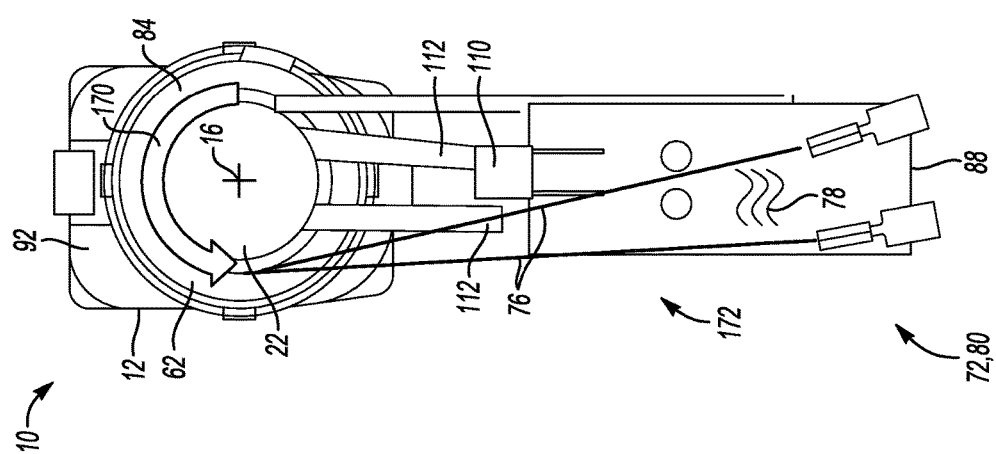
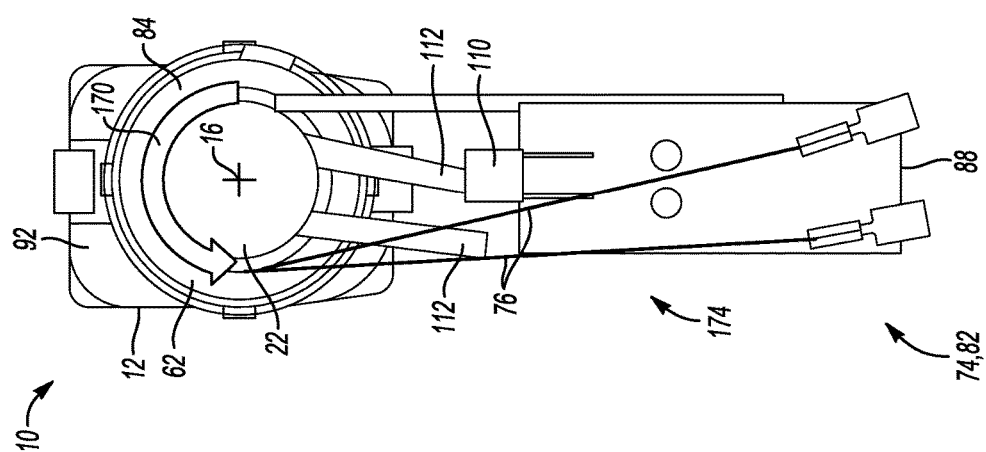

LOCKABLE LATCHING DEVICE

CROSS-REFERENCE TO RELATED APPLICATIONS

This application claims the benefit of U.S. Provisional Application No. 61/980,318, filed on Apr. 16, 2014, which is hereby incorporated by reference in its entirety.

TECHNICAL FIELD

The disclosure relates to a lockable latching device.

BACKGROUND

Storage and transportation devices often include a closure configured for storing goods. For example, vehicles often include closures such as a glove box, a storage console, a fuel filler compartment, and the like. Similarly, non-vehicular storage applications such as cabinetry, lockers, safes, and the like also often include closures. Such closures generally include a latch mechanism configured for latching and unlatching the closure. The latch mechanism may include numerous mechanical components, such as levers and latch arms, which are engaged to hold the closure in a closed position.

SUMMARY

A lockable latching device includes a body defining a cavity therein and having a central longitudinal axis. The lockable latching device also includes a plunger disposed within the cavity and having a first end and a second end spaced apart from the first end. The plunger is translatable with respect to the body along the central longitudinal axis between an open position in which the second end is disposed within the cavity, and a closed position in which the second end protrudes from the cavity. The lockable latching device also includes an annular rotator spaced apart from the body along the central longitudinal axis and configured for rotating the plunger about the central longitudinal axis. In addition, the lockable latching device includes an annular latch abutting the annular rotator. The annular latch is transitionable between an unlocked state in which the annular latch is rotatable about the central longitudinal axis and a locked state in which the annular latch is not rotatable about the central longitudinal axis. The lockable latching device further includes an element attached to the annular latch and formed from a shape memory alloy that is transitionable between an austenite crystallographic phase and a martensite crystallographic phase in response to an activation signal to thereby transition the annular latch from the locked state to the unlocked state.

In one embodiment, the plunger includes a plurality of legs extending from the second end and spaced apart from one another about the central longitudinal axis. Each of the plurality of legs includes a first edge that is substantially parallel to the central longitudinal axis, a second edge intersecting the first edge at a vertex that is spaced apart from the second end, and a third edge connecting the first edge and the second edge and defining a retention notch spaced apart from the vertex. The first edge and the second edge define an acute angle therebetween. The plunger is rotatable about the central longitudinal axis between an unlatched position in which the retention notch is positioned about the central longitudinal axis so that the retention notch is not abuttable with a respective one of the plurality of ribs as the plunger translates towards the proximal end, and a latched position in which the retention notch is positioned about the central longitudinal axis so that the retention notch is abuttable with the respective one of the plurality of ribs as the plunger translates towards the proximal end. Further, the annular rotator includes a plurality of ramps each configured for guiding the vertex of a respective one of the plurality of legs towards the annular latch as the plunger rotates between the unlatched position and the latched position.

In a further embodiment, the lockable latching device includes an actuator housing having a first portion attachable to the body and defining a first bore therein, and a second portion substantially perpendicular to the first portion and defining a second bore therein. The first bore and the second bore are connected to define an L-shaped channel.

As used herein, the terms "a," "an," "the," "at least one," and "one or more" are interchangeable and indicate that at least one of an item is present. A plurality of such items may be present unless the context clearly indicates otherwise. All numerical values of parameters, quantities, or conditions in this disclosure, including the appended claims, are to be understood as being modified in all instances by the term "about" or "approximately" whether or not "about" or "approximately" actually appears before the numerical value. "About" and "approximately" indicate that the stated numerical value allows some slight imprecision (e.g., with some approach to exactness in the value; reasonably close to the value; nearly; essentially). If the imprecision provided by "about" or "approximately" is not otherwise understood with this meaning, then "about" and "approximately" as used herein indicate at least variations that may arise from methods of measuring and using such parameters. Further, the terminology "substantially" also refers to a slight imprecision of a condition (e.g., with some approach to exactness of the condition; approximately or reasonably close to the condition; nearly; essentially). In addition, disclosed numerical ranges include disclosure of all values and further divided ranges within the entire range. Each value within a range and the endpoints of a range are all disclosed as separate embodiments. The terms "comprising," "includes," "including," "has," and "having" are inclusive and therefore specify the presence of stated items, but do not preclude the presence of other items. As used in this disclosure, the term "or" includes any and all combinations of one or more of the listed items.

The above features and advantages and other features and advantages of the present disclosure will be readily apparent from the following detailed description of the preferred embodiments and best modes for carrying out the present disclosure when taken in connection with the accompanying drawings and appended claims.

BRIEF DESCRIPTION OF THE DRAWINGS

FIG. 2 is a schematic illustration of a side view of a body, a plunger, an annular rotator, and an annular latch of the lockable latching device of FIG. 1, wherein the plunger is disposed in an open position and an unlatched position;

FIG. 3 is a schematic illustration of a side view of the lockable latching device of FIG. 2, wherein the plunger is depressed towards the annular rotator and the annular latch;

FIG. 4 is a schematic illustration of a side view of the lockable latching device of FIG. 1, wherein the plunger is disposed in a closed position;

FIG. 8 is a schematic illustration of a bottom view of the lockable latching device of FIG. 1 including a switch disposed in a blocked state, wherein the annular latch has the locked state;

FIG. 9 is a schematic illustration of a bottom view of the lockable latching device of FIG. 8, wherein the switch is disposed in an unblocked state and the annular latch is transitioning between an unlocked state and the locked state; and FIG. 10 is a schematic illustration of a bottom view of the lockable latching device of FIG. 8, wherein the switch is disposed in the blocked state and the annular latch has the unlocked state.

DETAILED DESCRIPTION

Figure 1:
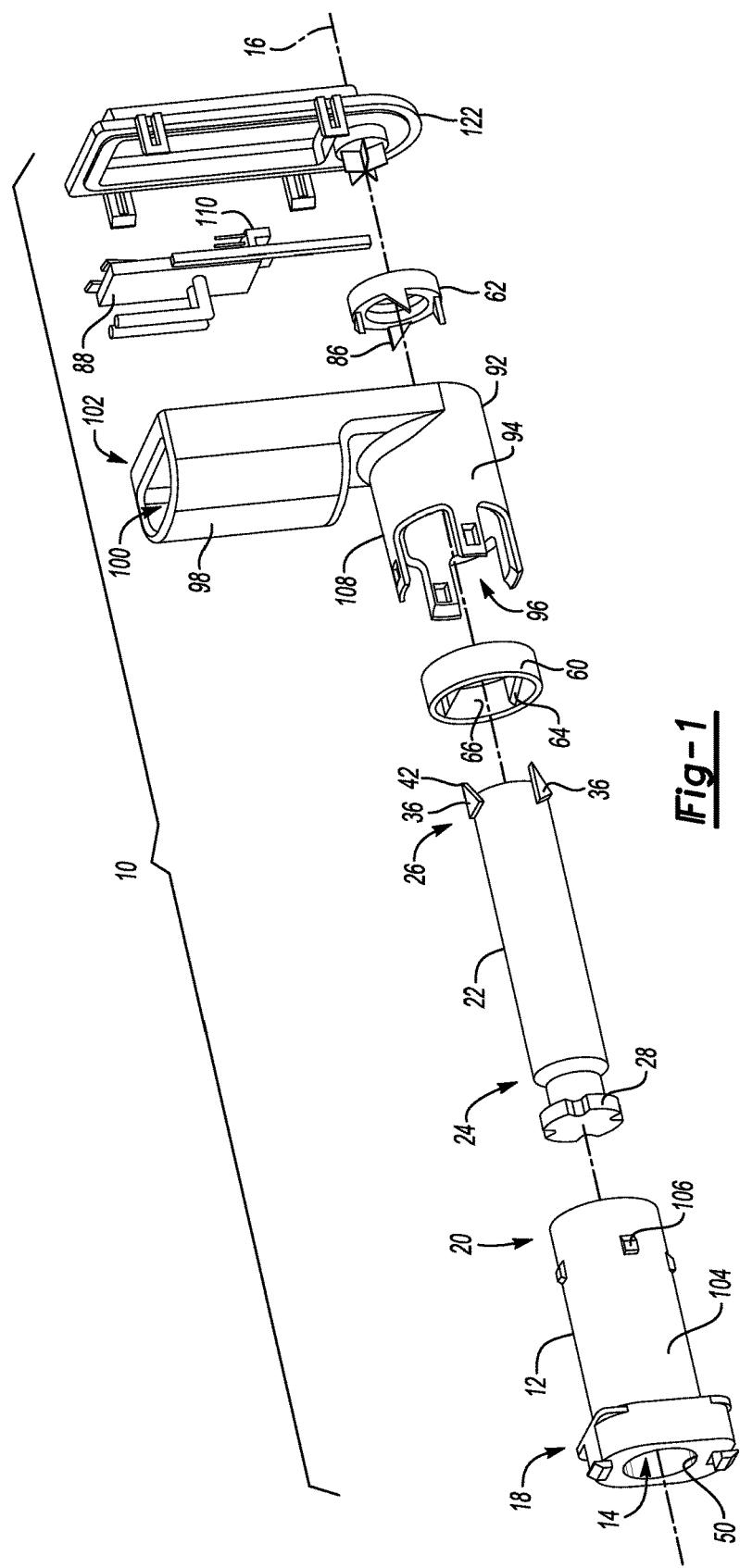
FIG. 1 is a schematic illustration of an exploded view of a lockable latching device.

Referring to the Figures, wherein like reference numerals refer to like elements, a lockable latching device is shown at 10 in FIG. 1. The lockable latching device 10 is both latchable, i.e., closeable or fastenable, and lockable. That is, the lockable latching device 10 may open, close, lock, and unlock. Therefore, the lockable latching device 10 may be useful for closures (not shown) for storage and transportation applications. For example, the lockable latching device 10 may be useful for vehicle applications such as fuel filler doors, glove boxes, storage bins, consoles, and the like. However, the lockable latching device 10 may also be useful for non-vehicular storage applications such as cabinetry, lockers, safes, and the like.

Referring to FIG. 1, the lockable latching device 10 includes a body 12 defining a cavity 14 therein and having a central longitudinal axis 16. The body 12 may have a generally cylindrical shape and may protect other components of the lockable latching device 10 from contaminants during operation. The body 12 may have a proximal end 18 and a distal end 20 spaced apart from the proximal end 18 along the central longitudinal axis 16, and may be formed from a material such as metal or plastic according to the operating conditions of the lockable latching device 10.

The lockable latching device 10 also includes a plunger 22 disposed within the cavity 14 and having a first end 24 and a second end 26 spaced apart from the first end 24. The plunger 22 may also have a generally cylindrical shape and may slide within the cavity 14 along the central longitudinal axis 16. The plunger 22 may also rotate about the central longitudinal axis 16. The first end 24 may be configured for engaging a door (not shown) of a closure (not shown), such as, for example, a fuel filler door of a vehicle. The first end 24 may define a plurality of members 28 configured for mating with a corresponding one of a plurality of grooves (not shown) defined by the door. That is, the first end 24 may be keyed to the plurality of grooves. For example, as shown in FIG. 1, the plurality of members 28 may form a cross and may each align with and seat within a respective one of the plurality of grooves when an operator shuts or closes the door. Alternatively, the plurality of members 28 may form a star, circle, square, or other pattern or shape or arrangement to thereby align with or rest within the plurality of grooves during certain operating conditions. That is, as set forth in more detail below, the plunger 22 may rotate about the central longitudinal axis 16 during operation of the lockable latching device 10 so as to alternately align and unalign the plurality of members 22 with the plurality of grooves defined by the door and thereby join to the door to open or close the door. Conversely, the plurality of members 28 may not align with or seat within the respective one of the plurality of grooves when the plunger 22 rotates about the central longitudinal axis 16, e.g., when the door is opened. Alternatively, the plurality of members 28 may not align with or seat within the respective one of the plurality of grooves when the door is closed. Further, although not shown, the lockable latching device 10 may also include a first resilient member, such as a compression spring, that is configured for applying a constant force to the plunger 22 in an upward direction (denoted by arrow 30 in FIG. 5) along the central longitudinal axis 16.

Referring now to FIGS. 2-4, the plunger 22 is translatable and rotatable within the cavity 14. That is, the plunger 22 is translatable with respect to the body 12 along the central longitudinal axis 16 between an open position 32 (FIG. 2) in which the second end 26 is disposed within the cavity 14, and a closed position 34 (FIG. 4) in which the second end 26 protrudes from the cavity 14. For example, an operator may depress the plunger 22, e.g., by pressing against a door (not shown) or surface (not shown) mated to the first end 24 of the plunger 22, to thereby transition the plunger from the open position 32 to the closed position 34. Therefore, the plunger 22 may be disposed in the open position 32 when the door or surface of the closure (not shown) is also open or spaced apart from a complementary component (not shown) to which the door or surface latches and/or locks. Conversely, the plunger 22 may be disposed in the closed position 34 when the door or surface of the closure is also closed, e.g., latched and/or locked to, the complementary component. That is, when the plunger 22 is disposed in the open position 32, an operator may access a storage compartment (not shown) covered by the door or surface. However, when the plunger 22 is disposed in the closed position 34, the door or surface may seal off and cover the storage compartment.

Referring again to FIG. 1, the plunger 22 includes a plurality of legs 36 extending from the second end 26 and each spaced apart from one another about the central longitudinal axis 16. For example, the plunger 22 may include four legs 36. The plurality of legs 36 may interact with the body 12 as the plunger 22 is depressed and translates between the open position 32 (FIG. 2) and the closed position 34 (FIG. 4), as set forth in more detail below.

As best shown in FIGS. 3-6, each of the plurality of legs 36 may be generally heart-shaped. More specifically, each of the plurality of legs 36 may include a first edge 38 that is substantially parallel to the central longitudinal axis 16, and a second edge 40 intersecting the first edge 38 at a vertex 42 that is spaced apart from the second end 26. The first edge 38 and the second edge 40 may define an acute angle 44 (FIG. 6) therebetween. That is, the second edge 40 may slope away from the first edge 38 at less than 90°. Further, each of the plurality of legs 36 may include a third edge 46 connecting the first edge 38 and the second edge 40 and defining a retention notch 48 spaced apart from the vertex 42. The retention notch 48 may hold or retain the plunger 22 in the closed position 34 (FIG. 4) after the plunger 22 is first depressed or pushed towards the distal end 20 of the body 12 by the operator.

Figure 5:
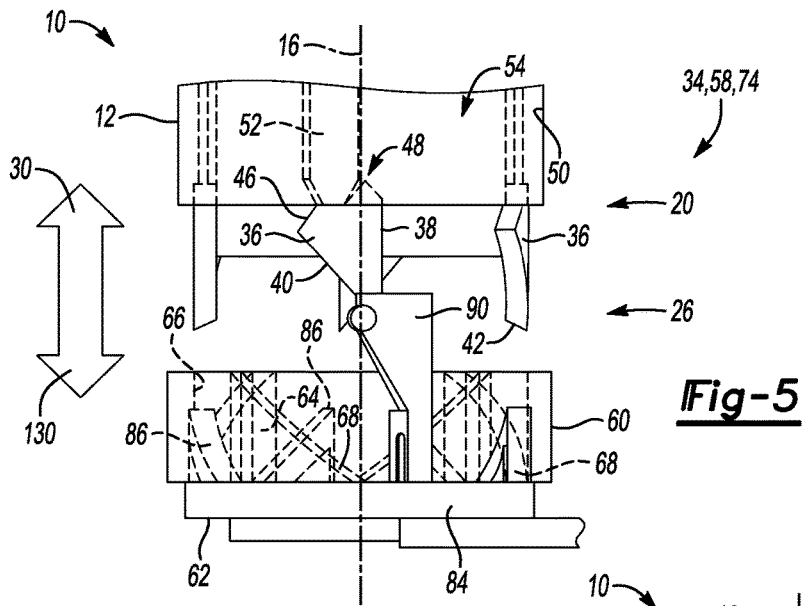
FIG. 5 is a schematic illustration of a partial side view of the lockable latching device of FIG. 4, wherein the plunger is disposed in a closed position and a latched position.

More specifically, as described with reference to FIGS. 3 and 4, the body 12 may have an internal surface 50 facing the plunger 22 and may include a plurality of ribs 52 extending along the internal surface 50. Each of the plurality of ribs 52 may be matable with the retention notch 48 of a respective one of the plurality of legs 36 as the plunger 22 translates from the open position 32 (FIG. 2) to the closed position 34 (FIG. 4). For example, as best shown in FIG. 5, each of the plurality of retention notches 48 is abuttable with a respective one of the plurality of ribs 52 when the plunger 22 is disposed in the closed position 34. That is, the retention notch 48 may contact the respective rib 52 so that the plunger 22 may no longer translate along the central longitudinal axis 16 in an upward direction 30, i.e., toward the first end 24 of the body 12. Therefore, after an operator initially depresses the plunger 22, e.g., by pressing against the door (not shown) or surface mated to the first end 24 to shut the door against a complementary component (not shown) to thereby enclose and cover a storage compartment (not shown), the plunger 22 may remain depressed within the cavity 14 since each of the plurality of retention notches 48 may rest against a respective one of the plurality of ribs 52.

As described with continued reference to FIGS. 3 and 4, the internal surface 50 may further define a plurality of release channels 54 therein, wherein adjacent ones of the plurality of release channels 54 are spaced apart from one another by one of the plurality of ribs 52. Each of the plurality of legs 36 may be translatable within a respective one of the plurality of release channels 54 when the plunger 22 is disposed in the open position 32 (FIG. 2). That is, as described with reference to FIG. 7 and set forth in more detail below, when the plunger 22 is disposed in the open position 32, each leg 36 may not contact the respective rib 52, but may instead be translatable within the respective release channel 54 so that the plunger 22 may travel along the central longitudinal axis 16 in an upward direction 30, i.e., toward the first end 24 of the body 12. Therefore, after an operator again depresses the plunger 22, e.g., by again pressing against the door (not shown) or surface mated to the first end 24, the plunger 22 may pop up within the cavity 14 since each of the plurality of legs 36 may travel within a respective one of the plurality of release channels 54.

Referring now to FIGS. 2-6, the plunger 22 may also be rotatable about the central longitudinal axis 16 as the plunger 22 is depressed, i.e., as the plunger 22 translates along the central longitudinal axis 16 in a downward direction (denoted by arrow 130 in FIG. 5). In particular, the plunger 22 may be rotatable between an unlatched position 56 (FIGS. 2 and 3) in which the retention notch 48 is positioned about the central longitudinal axis 16 so that the retention notch 48 is not abuttable with, i.e., not vertically aligned with, a respective one of the plurality of ribs 52 as the plunger 22 translates towards the proximal end 18, and a latched position 58 (FIGS. 4-6) in which the retention notch 48 is positioned about the central longitudinal axis 16 so that the retention notch 48 is abuttable with, i.e., is aligned with, the respective one of the plurality of ribs 52 as the plunger 22 translates towards the proximal end 18. The unlatched position 56 of the plunger 22 may correspond to a condition in which the door (not shown) or surface of the closure (not shown) is open and not sealed against a complementary component (not shown) so that a storage compartment (not shown) is accessible. Conversely, the latched position 58 of the plunger 22 may correspond to an opposite condition in which the door or surface of the closure is closed and mated against the complementary component so that the storage compartment is covered and not accessible.

Therefore, the open position 32 and the closed position 34 of the plunger 22 denote a vertical or longitudinal position of the plunger 22 within the cavity 14 along the central longitudinal axis 16, and the unlatched position 56 and the latched position 58 of the plunger 22 denote a rotational position of the plunger 22 about the central longitudinal axis 16.

As such, referring to FIG. 2, during some operating conditions, it is to be appreciated that the plunger 22 may be disposed in both the open position 32, i.e., so that the second end 26 does not protrude from the cavity 14, and the unlatched position 56, i.e., in which each retention notch 48 is not aligned or abuttable with a respective one of the plurality of ribs 52. This operating condition may correspond to a condition in which the door (not shown) or surface is open or pivoted away from the complementary component (not shown).

However, as shown in FIG. 3, after the plunger 22 is initially depressed, the plunger 22 may be disposed in both the closed position 34, i.e., wherein the second end 26 protrudes from the cavity 14, and the unlatched position 56, i.e., wherein the retention notch 48 is not aligned or abuttable with a respective one of the plurality of ribs 52. During such a condition, the plunger 22 may pop back up, i.e., travel in the upward direction 30 (FIG. 5) within the cavity 14 after the plunger 22 is initially depressed since the retention notch 48 may not abut a respective one of the plurality of ribs 52 to thereby prevent upwards translation of the plunger 22.

Figure 6:
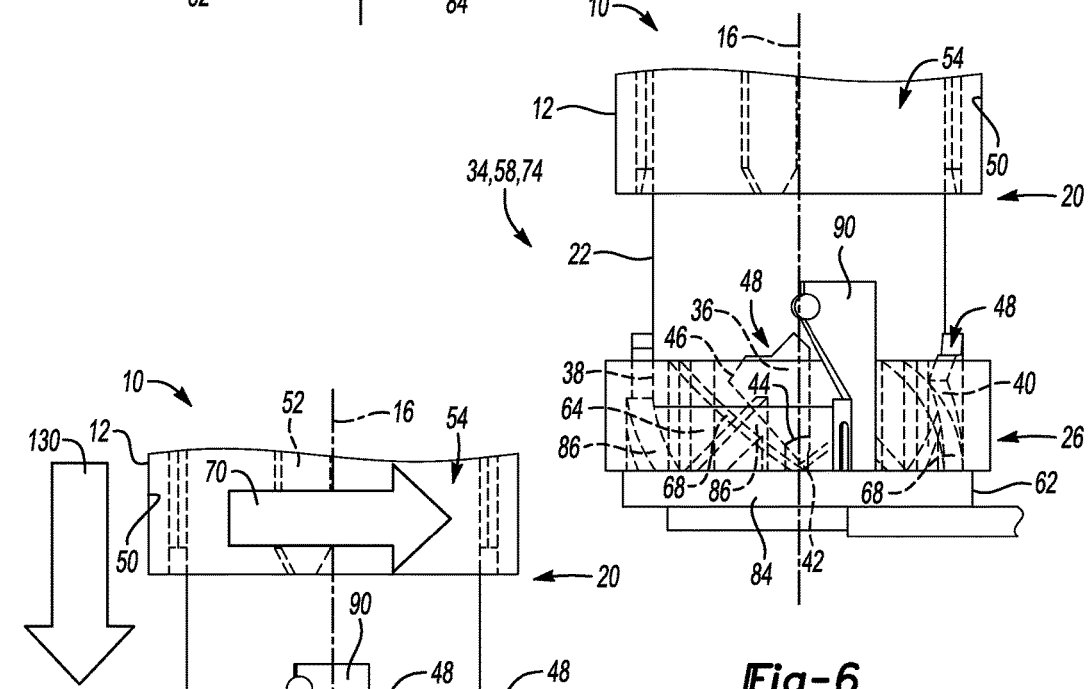
FIG. 6 is a schematic illustration of a partial side view of the lockable latching device of FIG. 1, wherein the annular latch has a locked state.

In contrast, during some operating conditions, as shown in FIGS. 4-6, the plunger 22 may be disposed in both the closed position 34, i.e., wherein the second end 26 protrudes from the cavity 14, and the latched position 58, i.e., wherein each retention notch 48 is abuttable with a respective one of the plurality of ribs 52 so that the plunger 22 is retained along the central longitudinal axis 16. This operating condition may correspond to a condition in which the door (not shown) or surface is closed against or latched to the complementary component (not shown) to close off or cover the storage compartment (not shown).

Figure 7:
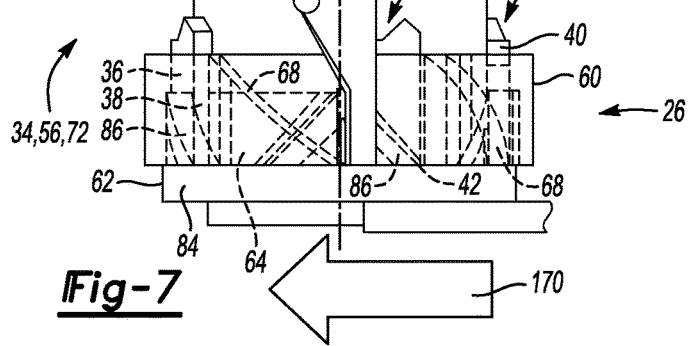
FIG. 7 is a schematic illustration of a partial side view of the lockable latching device of FIG. 1, wherein the annular latch has an unlocked state.

Further, as shown in FIG. 7, after the plunger 22 is again depressed for a second time, the plunger 22 may be disposed in both the closed position 34, i.e., wherein the second end 26 protrudes from the cavity 14, and the unlatched position 56, i.e., wherein the retention notch 48 is not aligned or abuttable with a respective one of the plurality of ribs 52, so that each leg 36 may translate within a respective one of the plurality of release channels 54 as the plunger 22 travels in an upward direction 30 (FIG. 5) within the cavity 14. During such a condition, the plunger 22 may pop back up, i.e., travel in the upward direction 30 within the cavity 14 after the plunger 22 is again depressed since the retention notch 48 may not abut a respective one of the plurality of ribs 52 and may therefore allow upwards translation of the plunger 22.

Referring again to FIG. 1, the lockable latching device 10 also includes an annular rotator 60 spaced apart from the body 12 along the central longitudinal axis 16 and configured for rotating the plunger 22 about the central longitudinal axis 16, as set forth in more detail below. The lockable latching device 10 further includes an annular latch 62 abutting the annular rotator 60 and configured for actuating release of the plunger 22 under certain operating conditions so that the plunger 22 may travel in the upward direction 30 (FIG. 5) within the cavity 14, as also set forth in more detail below. The annular rotator 60 may be disposed between the body 12 and the annular latch 62 along and/or about the central longitudinal axis 16. That is, the annular rotator 60 may surround at least a portion of the annular latch 62 such that the annular latch 62 is disposed between the central longitudinal axis 16 and the annular rotator 60.

As described with reference to FIGS. 2-4, the annular rotator 60 may include a plurality of ramps 64 each configured for guiding the vertex 42 of a respective one of the plurality of legs 36 towards the annular latch 62 as the plunger 22 rotates between the unlatched position 56 (FIGS. 2 and 3) and the latched position 58 (FIG. 4). That is, the annular rotator 60 may have an inside surface 66 that faces the plunger 22 and the inside surface 66 may define the plurality of ramps 64. The annular rotator 60 may include a number of ramps 64 corresponding to the number of legs 36 of the plunger 22, e.g., four. The plurality of ramps 64 may each have a sloped guide surface 68 (FIGS. 5-7) and may be arranged radially about the central longitudinal axis 16 along the inside surface 66 of the annular rotator 60.

During operation, as described with reference to FIGS. 2-4, as the plunger 22 is first depressed or pushed in the downward direction 130 (FIG. 5) toward the distal end 20 of the body 12 along the central longitudinal axis 16, the plunger 22 translates within the cavity 14 towards the annular rotator 60. As shown in FIG. 3, as each leg 36 contacts a respective one of the plurality of ramps 64, each vertex 42 translates along the respective one of the plurality of ramps 64 to rotate the plunger 22 in a first direction 70 (FIG. 7) and translate the plunger 22 from the unlatched position 56 (FIGS. 2 and 3) to the latched position 58 (FIG. 4). That is, the annular rotator 60 guides the legs 36 and thereby turns the plunger 22 in the first direction 70, e.g., counterclockwise, about the central longitudinal axis 16 as the plunger 22 is initially depressed. Therefore, the annular rotator 60 converts the longitudinal travel of the plunger 22 into rotational motion, and positions the plunger 22 in a desired rotational position, i.e., the latched position 58, so that each retention notch 48 vertically aligns with each rib 52.

As such, as described by comparing FIGS. 4 and 5, after the operator releases the initial downward pressure on the plunger 22, e.g., after the operator senses that the door (not shown) or surface is properly mated or closed to the complementary component (not shown) so that the storage compartment (not shown) is covered, the plunger 22 may pop up slightly within the cavity 14 and yet be retained in the closed position 34 since each retention notch 48 abuts a respective one of the plurality of ribs 52. It is noted that even if the operator once again depresses the plunger 22, e.g., perhaps in an attempt to open or unlatch the door (not shown) or surface from the complementary component (not shown), the plunger 22 will remain in the closed position 34 (FIG. 5). That is, although the plunger 22 may again depress towards the annular rotator 60 in response to the secondary or additional downward pressure applied to the plunger 22 by the operator, the plunger 22 may not further rotate about the central longitudinal axis 16. Rather, since the annular rotator 60 is stationary with respect to the body 12 and the plurality of ramps 64 are only aligned to guide the vertex 42 of each leg 36 into a position such that each retention notch 48 is positioned to abut the respective one of the plurality of ribs 52, the plunger 22 is yet again retained against the plurality of ribs 52 when the plunger 22 is again released in the upward direction 30 (FIG. 5). Therefore, the operator may depress and release the plunger 22 multiple times in succession after the initial push against the plunger 22, and yet the plunger 22 may not rotate to the open position 32 until the annular latch 62 is actuated.

Stated differently, in order to transition the plunger 22 from the closed position 34 to the open position 32 and thereby re-open the door (not shown) or surface mated to the complementary component (not shown) of the closure (not shown), two conditions must be satisfied: 1) downward pressure must be applied to the plunger 22 and 2) the annular latch 62 must be actuated so that the plunger 22 may rotate about the central longitudinal axis 16. That is, downward pressure must be applied to the plunger 22 while the annular latch 62 is actuated.

In particular, referring to FIGS. 6 and 7, the annular latch 62 is transitionable between an unlocked state 72 (FIG. 7) in which the annular latch 62 is rotatable about the central longitudinal axis 16 and a locked state 74 (FIG. 6) in which the annular latch 62 is not rotatable about the central longitudinal axis 16. The lockable latching device 10 may also include a second resilient member (not shown), which may bias the annular latch 62 to the locked state 74 as a default or initial state. Further, as best shown in FIGS. 8-10, the lockable latching device 10 also includes an element 76 attached to the annular latch 62 and formed from a shape memory alloy. The shape memory alloy is transitionable between an austenite crystallographic phase and a martensite crystallographic phase in response to an activation signal 78 (FIG. 9), e.g., a thermal activation signal or heat, to thereby transition the annular latch 62 from the locked state 74 (FIG. 8) to the unlocked state 72 (FIG. 10).

The shape memory alloy is transitionable in response to the activation signal 78 between a first temperature-dependent state and a second temperature-dependent state. In particular, the element 76 may be configured as a wire and may be attached to the annular latch 62. Therefore, as set forth in more detail below, the element 76 may actuate the annular latch 62 by transitioning between the first temperature-dependent state and the second temperature-dependent state such that the annular latch 62 rotates about the central longitudinal axis 16 within the cavity 14. Further, the element 76 may have a powered state 80 (FIGS. 9 and 10) in which the activation signal 78 is applied to the shape memory alloy, and a non-powered state 82 (FIG. 8) in which the activation signal 78 is not applied to the shape memory alloy.

As used herein, the terminology "shape memory alloy" refers to alloys that exhibit a shape memory effect and have the capability to quickly change properties in terms of stiffness, spring rate, and/or form stability. That is, the shape memory alloy may undergo a solid state crystallographic phase change via molecular or crystalline rearrangement to shift between the martensite crystallographic phase, i.e., "martensite", and the austenite crystallographic phase, i.e., "austenite". Stated differently, the shape memory alloy may undergo a displacive transformation rather than a diffusional transformation to shift between martensite and austenite. A displacive transformation is defined as a structural change that occurs by the coordinated movement of atoms or groups of atoms relative to neighboring atoms or groups of atoms. In general, the martensite phase refers to the comparatively lower-temperature phase and is often more deformable than the comparatively higher-temperature austenite phase.

The temperature at which the shape memory alloy begins to change from the austenite crystallographic phase to the martensite crystallographic phase is known as the martensite start temperature, $M_s$. The temperature at which the shape memory alloy completes the change from the austenite crystallographic phase to the martensite crystallographic phase is known as the martensite finish temperature, $M_f$. Similarly, as the shape memory alloy is heated, the temperature at which the shape memory alloy begins to change from the martensite crystallographic phase to the austenite crystallographic phase is known as the austenite start temperature, $A_s$. The temperature at which the shape memory alloy completes the change from the martensite crystallographic phase to the austenite crystallographic phase is known as the austenite finish temperature, $A_f$.

The shape memory alloy may have any suitable form, i.e., shape. For example, the element 76 may be configured as a shape-changing element such as a wire (FIGS. 8-10), spring, tape, band, continuous loop, and combinations thereof. Further, the shape memory alloy may have any suitable composition. In particular, the shape memory alloy may include in combination an element selected from the group of cobalt, nickel, titanium, indium, manganese, iron, palladium, zinc, copper, silver, gold, cadmium, tin, silicon, platinum, and gallium. For example, suitable shape memory alloys may include nickel-titanium based alloys, nickel-aluminum based alloys, nickel-gallium based alloys, indium-titanium based alloys, indium-cadmium based alloys, nickel-cobalt-aluminum based alloys, nickel-manganese-gallium based alloys, copper based alloys (e.g., copper-zinc alloys, copper-aluminum alloys, copper-gold alloys, and copper-tin alloys), gold-cadmium based alloys, silver-cadmium based alloys, manganese-copper based alloys, iron-platinum based alloys, iron-palladium based alloys, and combinations of one or more of each of these combinations. The shape memory alloy can be binary, ternary, or any higher order so long as the shape memory alloy exhibits a shape memory effect, e.g., a change in shape orientation, damping capacity, and the like. Generally, the shape memory alloy may be selected according to desired operating temperatures of the lockable latching device 10. In one specific example, the shape memory alloy may include nickel and titanium.

Therefore, the element 76 formed from the shape memory alloy may be characterized by a cold state, i.e., when a temperature of the shape memory alloy is below the martensite finish temperature, $M_f$, of the shape memory alloy. Likewise, the element 76 formed from the shape memory alloy may also be characterized by a hot state, i.e., when the temperature of the shape memory alloy is above the austenite finish temperature, $A_f$, of the shape memory alloy. In addition, although not shown, the lockable latching device 10 may include a plurality of elements 76 formed from the shape memory alloy.

Referring again to FIGS. 8-10, the element 76 may contract in length in response to the activation signal 78 to rotate the annular latch 62 in a second direction 170, e.g., clockwise, that is opposite the first direction 70 (FIG. 7). That is, the element 76 may pull on the annular latch 62 so that the annular latch 62 rotates about the central longitudinal axis 16. It is to be appreciated that the annular latch 62 may only be rotatable about the central longitudinal axis 16 in the second direction 170 when disposed in the unlocked state 72, e.g., while the activation signal 78 is applied to the element 76.

Referring to FIGS. 6 and 7, the annular latch 62 may include an annular base 84 and a plurality of sloped protrusions 86 extending from the annular base 84 toward the distal end 20, wherein each of the sloped protrusions 86 is spaced apart from one another about the central longitudinal axis 16. During operation, the vertex 42 of a respective one of the plurality of legs 36 may traverse along the respective one of the plurality of sloped protrusions 86 as the plunger 22 transitions from the closed position 34 (FIG. 6) to the open position 32 (FIG. 7) when the element 76 has the powered state 80.

That is, the plunger 22 may be rotatable about the central longitudinal axis 16 in the second direction 170 (FIG. 7) when the element 76 has the powered state 80. For example, referring again to FIG. 6, after the operator has transitioned the plunger 22 to the closed position 34, the operator may wish to re-open the door (not shown) or surface of the closure (not shown). To do so, the operator may reapply downward pressure to the plunger 22, i.e., push the plunger 22 towards the annular rotator 60 again, while the activation signal 78 (FIGS. 9 and 10) is applied to the element 76. For example, the activation signal 78 may be applied to the element 76 in response to the operator depressing a key fob and/or in response to the operator reapplying downward pressure again to the plunger 22. Alternatively, the activation signal 78 may be applied to the element 76 via a computer or controller device such as a printed circuit board (shown generally at 88 in FIGS. 8-10) so that the element 76 transitions from the non-powered state 82 (FIG. 8) to the powered state 80 (FIGS. 9 and 10) while the operator applies downward pressure to the plunger 22 or in response to the operator applying downward pressure to the plunger 22.

When the element 76 has the powered state 80, the element 76 may contract and tug on the annular latch 62. In response, the annular latch 62 may rotate in the second direction 170 within the stationary annular rotator 60. Therefore, as the vertex 42 contacts a respective one of the plurality of sloped protrusions 86, the sloped protrusion 86 may guide the vertex 42, rotate the plunger 22 in the first direction 70, and thereby allow each of the plurality of legs 36 to travel within a respective one of the plurality of release channels 54 as the plunger 22 rebounds in the upward direction 30 along the central longitudinal axis 16 as the operator releases downward pressure from the plunger 22.

For example, as described with reference to FIGS. 5-7, in one non-limiting embodiment, the annular latch 62 may include at least one flag 90 extending from the annular base 84 towards the distal end 20 of the body 12. The flag 90 may have a generally triangular shape and may be configured to catch on one or more of the plurality of legs 36. That is, when the element 76 is disposed in the powered state 80, i.e., when the activation signal 78 is applied to the shape memory alloy, and the plunger 22 is concurrently pushed downward along the central longitudinal axis 16 so as to unseat from the plurality of ribs 52, one of the plurality of legs 36 may bump or contact the at least one flag 90 so that the activation signal 78 is applied to the shape memory alloy and the annular latch 62 rotates in the second direction 170, e.g., clockwise. That is, since the element 76 has the powered state 80, the annular latch 62 may move about the central longitudinal axis 16 and thereby reposition the plurality of sloped protrusions 86 along the central longitudinal axis 16. Conversely, if the element 76 is in the non-powered state 82, the annular latch 62 may not rotate about the central longitudinal axis 16 and the plunger 22 may only re-seat against the plurality of ribs 52 once the downward pressure is removed from the plunger 22.

Consequently, referring now to FIG. 7, as the plunger 22 continues to translate in the downward direction 130, the vertex 42 of the each of the plurality of legs 36 may contact a respective one of the plurality of sloped protrusions 86, which have been newly repositioned about the central longitudinal axis 16 as the descending leg 36 contacted the at least one flag 90 to thereby nudge the annular latch 62 in the second direction 170. The plurality of sloped protrusions 86 may therefore guide each vertex 42 in the downward direction 130 so that the plunger 22 consequently rotates about the central longitudinal axis 16 in the first direction 70. Therefore, since each retention notch 48 may no longer be aligned with the respective one of the plurality of ribs 52, when the downward pressure is again released from the plunger 22, the plunger 22 may pop up within the cavity 14 and each of the plurality of legs 36 may travel within a respective one of the plurality of release channels 54. Therefore, the plunger 22 may travel in the upward direction 30 (FIG. 5) so that the second end 26 no longer protrudes from the cavity 14 and the plunger 22 is disposed in the open position 32 (FIG. 2) to thereby open, e.g., unlatch and unlock, the door (not shown) or surface of the closure (not shown) from the complementary component (not shown).

Conversely, referring again to FIG. 5, the plunger 22 may not be rotatable about the central longitudinal axis 16 in the second direction 170 when the element 76 has the non-powered state 82. Likewise, the annular latch 62 may not be rotatable about the central longitudinal axis 16 in the second direction 170 when the element 76 has the non-powered state 82. That is, even though the motion of the plunger 22 may nudge the flag 90, the lockable latching device 10 may not be powered and the thermal activation signal 78 may accordingly be removed from the element 76. Therefore, the closure (not shown) may remain locked such that the door (not shown) or surface is mated to the complementary component. That is, when the element 76 has the non-powered state 82, i.e., when the activation signal 78 is not applied to the element 76, the annular latch 62 may not be triggered to reposition the plurality of sloped protrusions 86. Such a condition may be useful when it is desired that the closure remain locked while also allowing an operator to attempt to depress the plunger 22. That is, the plunger 22 may still be translatable away from the distal end 20 along the central longitudinal axis 16 when the plunger 22 is disposed in the closed position 34 and the element 76 has the non-powered state 82. However, as the operator again removes the downward pressure from the plunger 22, the plunger 22 may only re-translate along the central longitudinal axis 16 to again re-seat each retention notch 48 against a respective one of the plurality of ribs 52. As such, the plunger 22 and door (not shown) or surface may remain in the closed position 34. That is, the door may be both latched and locked so that any attempt to unlatch the door is unsuccessful. Further, regardless of whether the element 76 has the powered state 80 or the non-powered state 82, the plunger 22 may nonetheless be translatable in the downward direction 130 along the central longitudinal axis 16. Therefore, regardless of whether the activation signal 78 is applied or not applied to the element 76, an operator may always close or latch the door (not shown) or surface against the complementary component (not shown) of the closure (not shown).

Referring again to FIG. 1, the lockable latching device 10 may also include an actuator housing 92. The actuator housing 92 may protect an actuator portion of the lockable latching device 10, e.g., the annular latch 62 and the element 76, from contaminants. The actuator housing 92 may have a first portion 94 attachable to the body 12 and defining a first bore 96 therein. The actuator housing 92 may also have a second portion 98 substantially perpendicular to the first portion 94 and defining a second bore 100 therein. Therefore, the first bore 96 and the second bore 100 may be connected to form an L-shaped channel 102.

With continued reference to FIG. 1, the body 12 may also have an exterior surface 104 and may include a plurality of tabs 106 extending from the exterior surface 104. In addition, the actuator housing 92 may include a plurality of arms 108 each attachable to a respective one of the plurality of tabs 106 to thereby attach the body 12 to the actuator housing 92. As such, the annular rotator 60, the annular latch 62, and the plunger 22 may be disposed within the first bore 96, and the element 76 may be disposed within the second bore 100 along the second portion 98.

In addition, as described with reference to FIGS. 8-10, the lockable latching device 10 may further include a switch 110 transitionable between a blocked state 174 (FIG. 8) in which the annular latch 62 has the locked state 74, and an unblocked state 172 (FIGS. 9 and 10) in which the annular latch 62 has the unlocked state 72. The switch 110 may be any suitable electronic, pneumatic, and/or mechanical switch configured for transitioning between the blocked state 174 and the unblocked state 172. For example, the switch 110 may be configured as a C-shaped photointerrupter. The lockable latching device 10 may include one or more fingers 112 that may rotate with the annular latch 62 to activate the switch 110. For example, the one or more fingers 112 may swing across an optical eye to interrupt a signal and thereby transition the switch 110 between the unblocked state 172 and the blocked state 174. The lockable latching device 10 may also include a cover 122 (FIG. 1) matable to the actuator housing 92 and configured for protecting the element 76 and the switch 110 from contaminants.

Therefore, in operation and described generally, the operator may first push against the plunger 22 so that the plunger 22 travels in the downward direction 130 within the cavity 14 along the central longitudinal axis 16. As the legs 36 of the plunger 22 contact the plurality of ramps 64 of the annular rotator 60, the plurality of ramps 64 may guide the legs 36 downward and in the first direction 70 to thereby rotate the plunger 22 about the central longitudinal axis 16 until each retention notch 48 is longitudinally aligned to abut and seat against a respective one of the plurality of ribs 52 of the body 12. As the operator removes the applied downward pressure from the plunger 22, the plunger 22 may rebound in the upward direction 30 along the central longitudinal axis 16 until each retention notch 48 contacts the respective one of the plurality of ribs 52 and thereby retains the plunger 22 in the closed position 34 so that the door (not shown) or surface may be closed or latched to the complementary component (not shown) of the closure.

Under one option, the operator may next attempt to open or unlatch the door (not shown) or surface from the complementary component (not shown) when the element 76 has the non-powered state 82, i.e., when the activation signal 78 is not applied to the element 76. For this option, the operator may again push the plunger 22 in the downward direction 130 along the central longitudinal axis 16. However, since the activation signal 78 is not applied to the element 76, the element 76 may not contract and may not rotate the annular latch 62. As such, the annular latch 62 may not be in the unlocked state 72 and the plurality of sloped protrusions 86 may not assist in rotating the plunger 22 again so that each leg 36 cannot travel within the plurality of release channels 54. Rather, the annular latch 62 may not rotate, and the plunger 22 may again rebound in the upward direction 30 when the applied pressure is removed from the plunger 22 so that each retention notch 48 is again retained against a respective one of the plurality of ribs 52. Consequently, the plunger 22 may not successfully open or unlatch the door (not shown) or surface.

Under an alternative option, the operator may next attempt to open or unlatch the door (not shown) or surface from the complementary component (not shown) when the element 76 has the powered state 80, i.e., when the activation signal 78 is applied to the element 76 while the operator applies downward pressure to the plunger 22. For this option, the operator may again push the plunger 22 in the downward direction 130 along the central longitudinal axis 16. However, since the activation signal 78 is concurrently applied to the element 76, the element 76 may contract and may accordingly rotate the annular latch 62. As such, the annular latch 62 may transition to the unlocked state 72 and the plurality of sloped protrusions 86 may assist in rotating the plunger 22 so that each leg 36 may travel within the plurality of release channels 54. That is, the annular latch 62 may rotate in the second direction 170 and the plunger 22 may again rebound in the upward direction 30 when the applied pressure is removed from the plunger 22 so that each retention notch 48 is not retained against a respective one of the plurality of ribs 52. Consequently, the plunger 22 may successfully open or unlatch the door (not shown) or surface.

As such, the lockable latching device 10 may be configured as a push-push latch that is both latchable and lockable. That is, a latching function of the lockable latching device 10 may be controlled by the plunger 22, the annular rotator 60, and the body 12, while a locking function of the lockable latching device 10 may be separately controlled by the annular latch 62 and the element 76. That is, the latching function may be de-coupled from the locking function.

While the best modes for carrying out the disclosure have been described in detail, those familiar with the art to which this disclosure relates will recognize various alternative designs and embodiments for practicing the disclosure within the scope of the appended claims.

The invention claimed is:

1. A lockable latching device comprising:
    a body defining a cavity therein and having a central longitudinal axis;
    a plunger disposed within the cavity and having a first end and a second end spaced apart from the first end, wherein the plunger is translatable with respect to the body along the central longitudinal axis between:
        an open position in which the second end is disposed within the cavity; and
        a closed position in which the second end protrudes from the cavity;
    wherein the plunger includes a plurality of legs extending from the second end and each spaced apart from one another about the central longitudinal axis;
    wherein each of the plurality of legs includes:
        a first edge that is substantially parallel to the central longitudinal axis;
        a second edge intersecting the first edge at a vertex that is spaced apart from the second end, wherein the first edge and the second edge define an acute angle therebetween; and
        a third edge connecting the first edge and the second edge and defining a retention notch spaced apart from the vertex;
    an annular rotator spaced apart from the body along the central longitudinal axis and configured for rotating the plunger about the central longitudinal axis;
    an annular latch abutting the annular rotator and transitionable between:
        an unlocked state in which the annular latch is rotatable about the central longitudinal axis; and
        a locked state in which the annular latch is not rotatable about the central longitudinal axis; and
    an element attached to the annular latch and formed from a shape memory alloy that is transitionable between an austenite crystallographic phase and a martensite crystallographic phase in response to an activation signal to thereby transition the annular latch from the locked state to the unlocked state;
    wherein the body has an internal surface facing the plunger and includes a plurality of ribs extending along the internal surface, wherein each of the plurality of ribs is matable with the retention notch of a respective one of the plurality of legs as the plunger translates from the open position to the closed position.

2. The lockable latching device of claim 1, wherein the body has a proximal end and a distal end spaced apart from the proximal end along the central longitudinal axis, and further wherein the plunger is rotatable about the central longitudinal axis between:
    an unlatched position in which the retention notch is positioned about the central longitudinal axis so that the retention notch is not abuttable with a respective one of the plurality of ribs as the plunger translates towards the proximal end; and
    a latched position in which the retention notch is positioned about the central longitudinal axis so that the retention notch is abuttable with the respective one of the plurality of ribs as the plunger translates towards the proximal end.

3. The lockable latching device of claim 1, wherein the internal surface defines a plurality of release channels therein, and wherein adjacent ones of the plurality of release channels are spaced apart from one another by one of the plurality of ribs.

4. The lockable latching device of claim 3, wherein each of the plurality of retention notches is abuttable with a respective one of the plurality of ribs when the plunger is disposed in the closed position, and wherein each of the plurality of legs is translatable within a respective one of the plurality of release channels when the plunger is disposed in the open position.

5. The lockable latching device of claim 1, wherein the annular rotator is disposed between the body and the annular latch along the central longitudinal axis.

6. A lockable latching device comprising:
    a body defining a cavity therein and having a central longitudinal axis, wherein the body has a proximal end and a distal end spaced apart from the proximal end along the central longitudinal axis;
    a plunger disposed within the cavity and having a first end and a second end spaced apart from the first end, wherein the plunger is translatable with respect to the body along the central longitudinal axis between:
        an open position in which the second end is disposed within the cavity; and
        a closed position in which the second end protrudes from the cavity;
    wherein the body has an internal surface facing the plunger and includes a plurality of ribs extending along the internal surface;
    wherein the plunger is rotatable about the central longitudinal axis between:
        an unlatched position in which the retention notch is positioned about the central longitudinal axis so that the retention notch is not abuttable with a respective one of the plurality of ribs as the plunger translates towards the proximal end; and
        a latched position in which the retention notch is positioned about the central longitudinal axis so that the retention notch is abuttable with the respective one of the plurality of ribs as the plunger translates towards the proximal end wherein the plunger includes a plurality of legs extending from the second end and each spaced apart from one another about the central longitudinal axis;

wherein each of the plurality of legs includes:
 a first edge that is substantially parallel to the central longitudinal axis;
 a second edge intersecting the first edge at a vertex that is spaced apart from the second end, wherein the first edge and the second edge define an acute angle therebetween; and
 a third edge connecting the first edge and the second edge and defining a retention notch spaced apart from the vertex;

an annular rotator spaced apart from the body along the central longitudinal axis and configured for rotating the plunger about the central longitudinal axis;

an annular latch abutting the annular rotator and transitionable between:
 an unlocked state in which the annular latch is rotatable about the central longitudinal axis; and
 a locked state in which the annular latch is not rotatable about the central longitudinal axis; and an element attached to the annular latch and formed from a shape memory alloy that is transitionable between an austenite crystallographic phase and a martensite crystallographic phase in response to an activation signal to thereby transition the annular latch from the locked state to the unlocked state;

wherein the annular rotator includes a plurality of ramps each configured for guiding the vertex of a respective one of the plurality of legs towards the annular latch as the plunger rotates between the unlatched position and the latched position.

7. The lockable latching device of claim 6, wherein the vertex translates along a respective one of the plurality of ramps to rotate the plunger in a first direction and translate the plunger from the unlatched position to the latched position.

8. The lockable latching device of claim 7, wherein the element contracts in length in response to the activation signal to rotate the annular latch in a second direction that is opposite the first direction.

9. The lockable latching device of claim 8, wherein the annular latch is only rotatable about the central longitudinal axis in the second direction when disposed in the unlocked state.

10. The lockable latching device of claim 9, wherein the element has a powered state in which the activation signal is applied to the shape memory alloy and a non-powered state in which the activation signal is not applied to the shape memory alloy.

11. The lockable latching device of claim 10, wherein the plunger is translatable away from the distal end along the central longitudinal axis when the plunger is disposed in the closed position and the element has the non-powered state.

12. The lockable latching device of claim 10, wherein the plunger is rotatable about the central longitudinal axis in the second direction when the element has the powered state, and wherein the plunger is not rotatable about the central longitudinal axis in the second direction when the element has the non-powered state.

13. The lockable latching device of claim 10, wherein the annular latch is not rotatable about the central longitudinal axis in the second direction when the element has the non-powered state.

14. The lockable latching device of claim 11, wherein the annular latch includes a plurality of sloped protrusions extending toward the distal end and each spaced apart from one another about the central longitudinal axis.

15. The lockable latching device of claim 14, wherein the vertex of a respective one of the plurality of legs traverses along a respective one of the plurality of sloped protrusions as the plunger transitions from the closed position to the open position when the element has the powered state.

16. A lockable latching device comprising:
 a body defining a cavity therein and having a central longitudinal axis;
 a plunger disposed within the cavity and having a first end and a second end spaced apart from the first end, wherein the plunger is translatable with respect to the body along the central longitudinal axis between:
  an open position in which the second end is disposed within the cavity; and
  a closed position in which the second end protrudes from the cavity;
 an annular rotator spaced apart from the body along the central longitudinal axis and configured for rotating the plunger about the central longitudinal axis;
 an annular latch abutting the annular rotator and transitionable between:
  an unlocked state in which the annular latch is rotatable about the central longitudinal axis; and
  a locked state in which the annular latch is not rotatable about the central longitudinal axis;
 an element attached to the annular latch and formed from a shape memory alloy that is transitionable between an austenite crystallographic phase and a martensite crystallographic phase in response to an activation signal to thereby transition the annular latch from the locked state to the unlocked state; and
 an actuator housing having:
  a first portion attachable to the body and defining a first bore therein; and
  a second portion substantially perpendicular to the first portion and defining a second bore therein, wherein the first bore and the second bore are connected to define an L-shaped channel;
 wherein the annular rotator, the annular latch, and the plunger are disposed within the first bore.

* * * * *